United States Patent
Chapman

(10) Patent No.: US 6,370,905 B1
(45) Date of Patent: Apr. 16, 2002

(54) AIR MASS ISOLATION SYSTEM

(76) Inventor: Jeffrey A. Chapman, 15641 E. Sycamore, Fountain Hills, AZ (US) 58268

( * ) Notice: Subject to any disclaimer, the term of this patent is extended or adjusted under 35 U.S.C. 154(b) by 0 days.

(21) Appl. No.: 09/767,996

(22) Filed: Jan. 23, 2001

(51) Int. Cl.[7] .............................................. F25D 17/04
(52) U.S. Cl. .............................. 62/404; 62/239; 62/383
(58) Field of Search ............................. 62/89, 98, 239, 62/265, 329, 383, 404; 141/98, 114

(56) References Cited

U.S. PATENT DOCUMENTS

| | | | | |
|---|---|---|---|---|
| 3,939,887 A | * | 2/1976 | Scarnato | 150/0.5 |
| 4,021,972 A | | 5/1977 | Choate et al. | 52/2 |
| 4,033,527 A | | 7/1977 | Parsons | 244/99 |
| 4,187,896 A | | 2/1980 | Shore | 160/121 R |
| 4,986,494 A | | 1/1991 | Tockert | 244/96 |
| 5,033,133 A | | 7/1991 | Nissen | 5/450 |
| 5,447,110 A | * | 9/1995 | Brown | 141/2 |
| 5,913,342 A | * | 6/1999 | Mcgill | 141/1 |
| 5,992,795 A | | 11/1999 | Tockert | 244/31 |

FOREIGN PATENT DOCUMENTS

| | | | |
|---|---|---|---|
| WO | WO 99/26839 | 6/1999 | ............ B64B/1/00 |

OTHER PUBLICATIONS

Richard Truett, "Test Drive Auto Review: Chevrolet Blazer LT Four Door", *Orlando Sentinel*, pp. 1 of 2, (Jan. 22, 1998).

* cited by examiner

*Primary Examiner*—William Doerrler
*Assistant Examiner*—Melvin Jones
(74) *Attorney, Agent, or Firm*—Edwin A. Suominen; Louis J. Hoffman

(57) ABSTRACT

In an exemplary configuration, an air container is placed in a vacant portion of a structure and substantially prevents convection between an air mass in that portion and an adjacent air mass of an occupied portion of the structure. By thus isolating the air masses, the air container restricts heat transfer between them and advantageously allows the occupied portion's air mass to heat up and cool down without requiring substantial heating and cooling (at least initially) of the vacant portion's air mass. Other methods and structures with different advantageous features are also described.

15 Claims, 4 Drawing Sheets

AIR MASS ISOLATION SYSTEM

BACKGROUND OF THE INVENTION

Many structures, both mobile and fixed, have excess interior portions that are unused under normal conditions. For example, many sport utility vehicles presently on the market usually carry only a single occupant (the driver) and are only occasionally filled with passengers or cargo. Consequently, large interior portions of such vehicles typically remain vacant and unused. Other examples of unoccupied structural portions are the many rooms and open areas that remain vacant in buildings pending future expansion, lease agreements, new employees, and special occasions.

Heating and cooling the air masses within these unused interior portions of structures wastes a significant amount of energy, particularly when the structures' occupied portions undergo temperature changes throughout periods of use. When the driver and sole occupant of a conventionally equipped sport utility vehicle begins an afternoon commute in hot weather, for example, the driver is typically forced to turn on the vehicle's air conditioning at its maximum setting to cool the entire interior of the vehicle. Even though the driver is only concerned about cooling the front portion of the vehicle (the area in his or her immediate vicinity), convection throughout the vehicle's open interior limits the temperature difference between the front and rear portions. Similarly, the heating and cooling system of an "open office" (a portion of a structure having cubicles instead of permanent dividing walls) must heat and cool substantially the entire air mass of the open office even though portions of the open office (e.g., certain cubicles) may be unoccupied.

Often, even steady-state heating and cooling of air masses within unused interior portions wastes energy. When an unused portion is adjacent an exterior wall of a structure, heat conducts (through the exterior wall) between the unused portion and outside air surrounding the structure.

In many conventional air conditioning systems, such as automobile air conditioning units, the efficiency (and the rate of energy consumption) depends greatly on the rate of cooling. Convection between occupied and unoccupied portions of an automobile can require its air conditioning system to operate at a high cooling rate (and a correspondingly low efficiency rate) for more time than would be necessary just to cool the occupied portion.

Consequently, a need remains for substantially preventing convection between the air masses of vacant and occupied portions of structures. A further need remains for selectively preventing and permitting such convection when portions of structures undergo transitions between vacant and occupied states.

SUMMARY OF THE INVENTION

In accordance with aspects of the present invention, including various advantageous methods, an air mass within a first portion of a structure is isolated from an adjacent air mass within a second portion of the structure. When isolation is desired, an air container substantially occupies the first portion of the structure and substantially prevents convection between the air masses within the first and second portions of the structure. When isolation is not desired, the air container vacates the first portion. The air container can inflate within the structure's first portion to substantially occupy it, and can deflate to vacate the portion. Alternatively, the air container can be brought into and out of the first portion to substantially occupy and vacate the portion, respectively.

By preventing convection between adjacent air masses (one of which may largely or completely surround the other), an air container according to various aspects of the invention restricts heat transfer between the air masses. Advantageously, one air mass can achieve a desired temperature faster and more efficiently when the air container restricts heat transfer from that air mass to an adjacent, unused air mass.

A particularly advantageous air container according to various aspects of the invention includes a semi-rigid, substantially air-impermeable shell that is collapsible to a predetermined collapsed shape and expandable to a predetermined expanded shape. The air container can further include a selective air passage that permits air to enter the shell when it expands. The air passage can be selectably opened to permit air to exit the shell when the shell is to be collapsed.

A method of the invention particularly enhances efficiency and speed of heating and cooling within a vehicle (especially a van or sport utility vehicle). In the method, an air container of the invention is placed in a rear seating portion or cargo portion of the vehicle. Advantageously, the air container can be dimensioned to fit, when fully inflated, in the rear seating or cargo portion with substantially all of its enclosed volume below the level of the vehicle's rear window.

The above summary does not include an exhaustive list of all aspects of the present invention. Indeed, the inventor contemplates that his invention includes all systems and methods that can be practiced from all suitable combinations of the various aspects summarized above, as well as those disclosed in the detailed description below and particularly pointed out in the claims filed with the application. Such combinations have particular advantages not specifically recited in the above summary.

BRIEF DESCRIPTION OF THE DRAWINGS

Various embodiments of the present invention are described below with reference to the drawings, wherein like designations denote like elements.

DESCRIPTION OF PREFERRED EXEMPLARY EMBODIMENTS

According to various aspects of the present invention, an air container placed in a vacant portion of a structure substantially prevents convection between an air mass in that portion and an adjacent air mass of an occupied portion of the structure. By thus isolating the air masses, the air container restricts heat transfer between them and advantageously allows the occupied portion's air mass to heat up and cool down without requiring substantial heating and cooling (at least initially) of the vacant portion's air mass. An example of a thermal system including an air container and a structure in which it resides may be better understood with reference to FIGS. 1 and 3.

Figure 1:
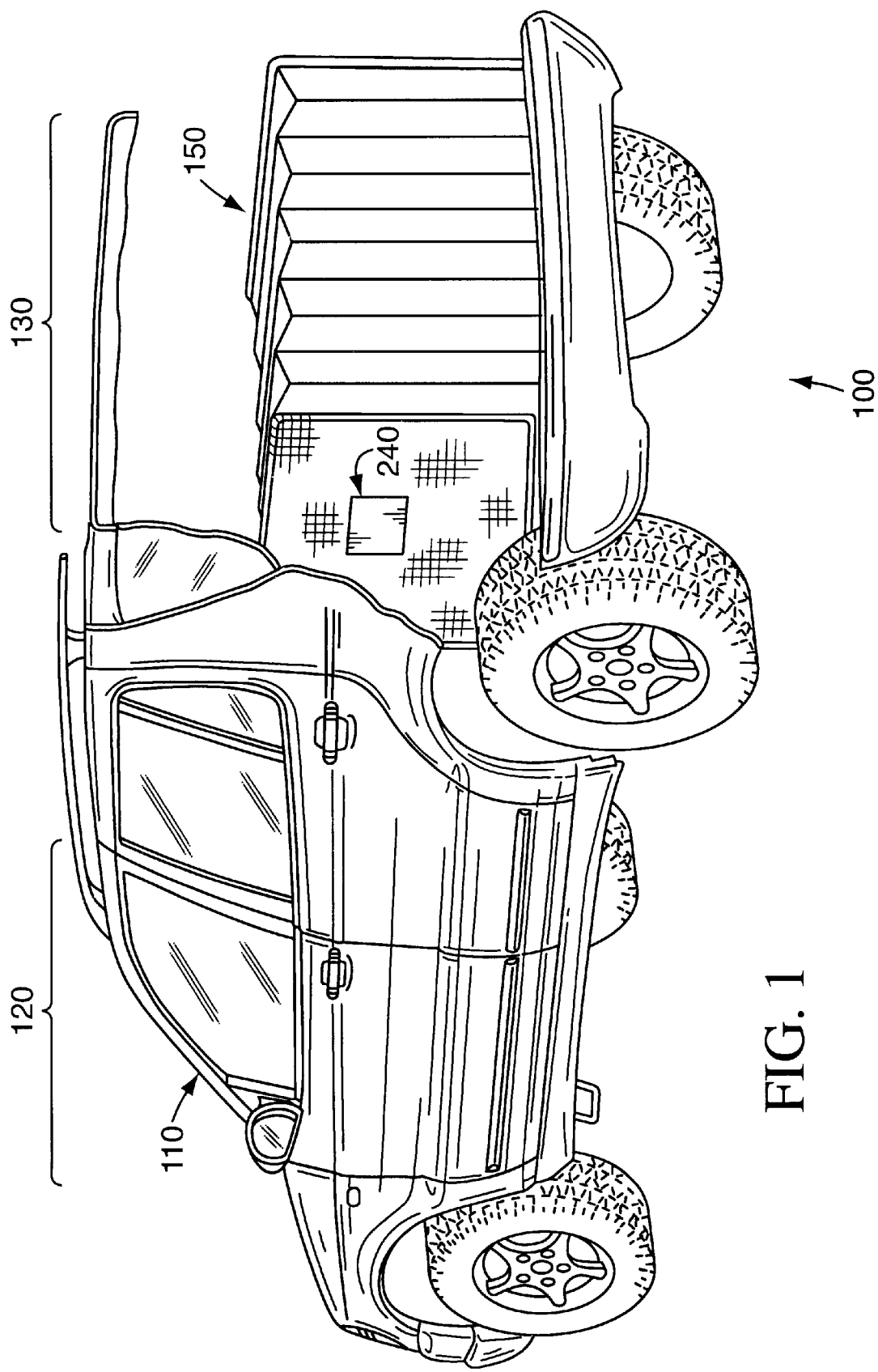
FIG. 1 is a cutaway perspective view of a vehicle with an air container inflated in a cargo portion of the vehicle, according to various aspects of the invention.
Figure 3:
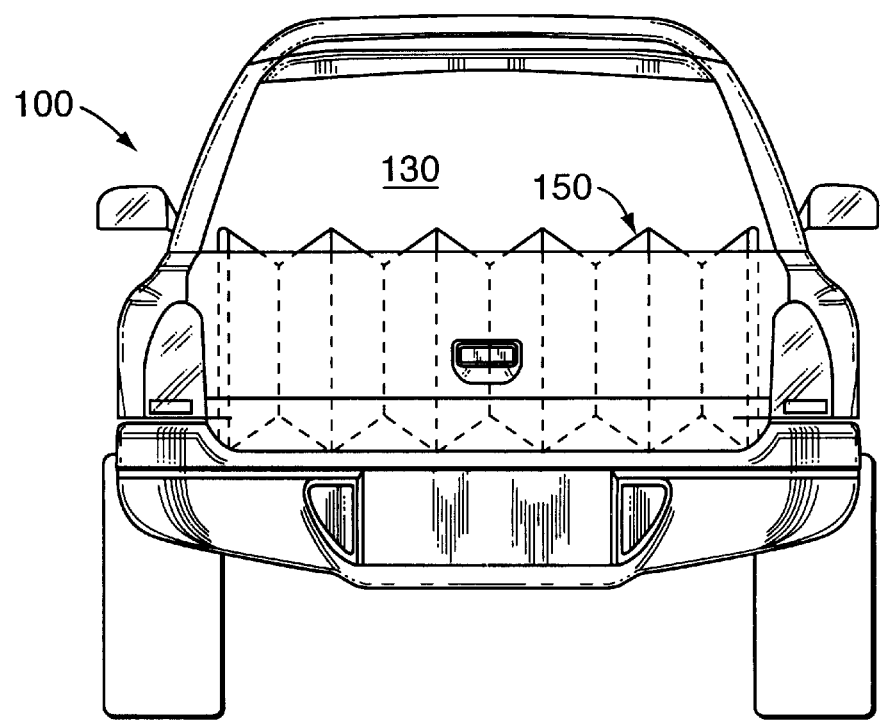
FIG. 3 is a rear view of the vehicle of FIG. 1.

Exemplary system 100 of FIGS. 1 and 3 includes a mobile structure, namely a conventional sport utility vehicle 110, and an air container 150. Vehicle 110 includes a front portion 120, which a driver and perhaps one passenger occupy during typical usage, and a rear portion 130, which occasionally holds cargo such as groceries, camping gear, etc. In variations, air containers according to various aspects of the invention can be advantageously employed in other types of mobile structures such as vans, trucks, mobile homes (under tow), recreational vehicles, passenger cars, boats, etc. and in fixed structures such as houses, mobile homes (at a fixed location), and office buildings.

Air container 150, which substantially occupies rear portion 130, isolates the respective air masses within front portion 120 and rear portion 130 enough to substantially prevent convection between them. This advantageous operation of an air container according to various aspects of the invention is discussed in detail below with reference to FIGS. 5 and 6, which schematically depict a structurally simplified system 500.

An air container according to various aspects of the invention includes any shell that encloses a mass of air to substantially isolate the enclosed air mass from an adjacent mass of air. The adjacent air mass may largely or completely surround the air mass within the shell, or it may simply be disposed alongside it.

TABLE I below lists examples of entirely flexible, semi-rigid, and entirely rigid shells. A semi-rigid shell is simply a shell that is neither entirely flexible nor entirely rigid, though it can include portions that are flexible or rigid.

TABLE I

| Type of Shell | Example |
| --- | --- |
| Entirely flexible | Inflatable vinyl envelope, preferably including baffles that separate internal sections. |
| Semi-rigid | Treated fabric envelope supported by a collapsible frame or frame elements such as wire loops. |
| Entirely rigid | Box made of corrugated cardboard or plastic. |

An air container according to various aspects of the invention is said to substantially occupy a portion of a structure when the air container holds within it much of the air mass within that portion. As illustrated in FIG. 1, air container 150 occupies a little more than half of rear portion 130 of vehicle 110. When advantageously configured for use in a sport utility vehicle's cargo compartment, air container 150 is between about 3–5 feet in length, about 3–4 feet in width, and about 1–2 feet in height (depth).

Figure 4:
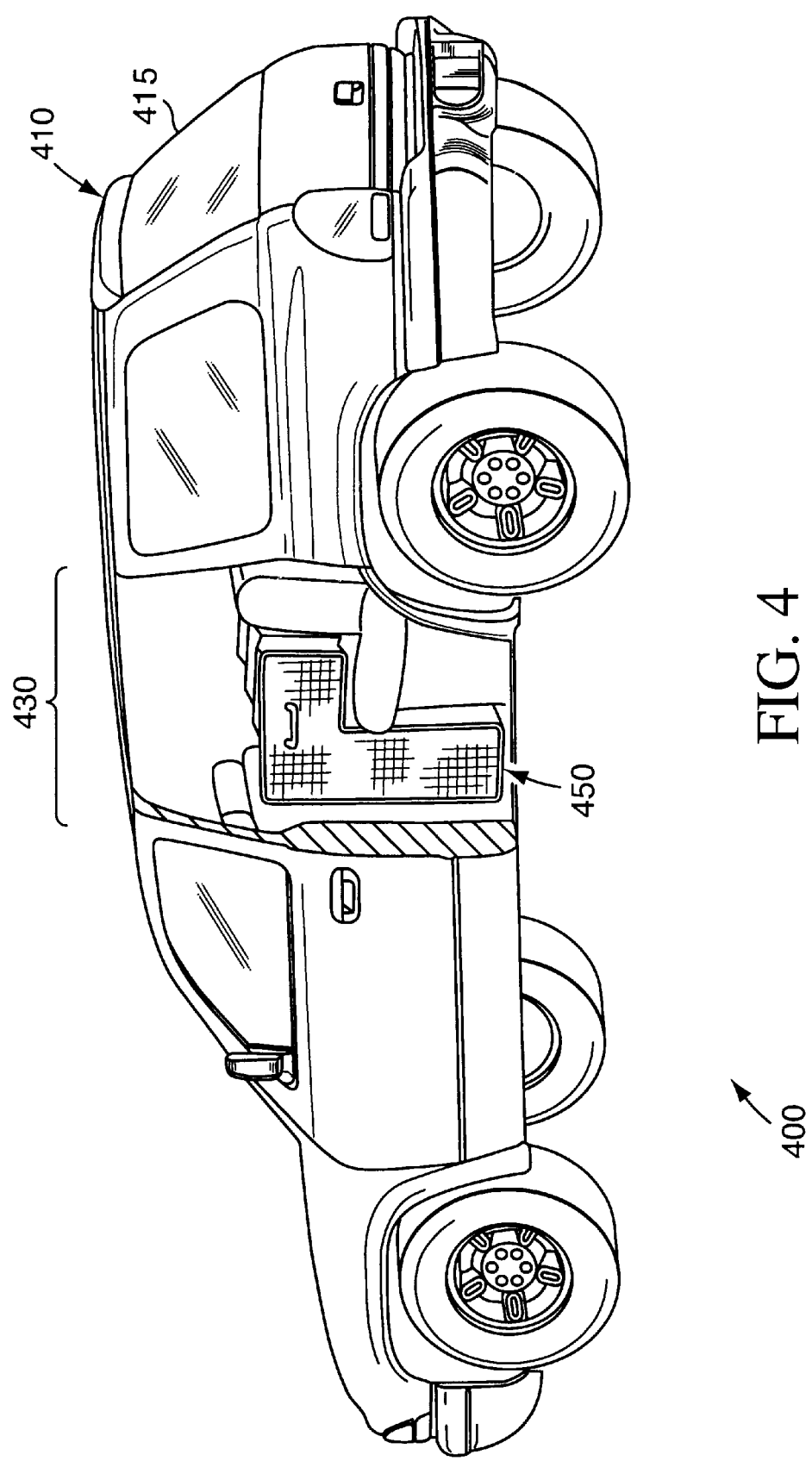
FIG. 4 is a perspective view of a vehicle with an air container inflated in a rear seating portion of the vehicle, according to various aspects of the invention.

As illustrated in FIG. 4, air container 450 occupies a little more than half of rear seating portion 430 (here counting the volume from floor to ceiling) of vehicle 410. When advantageously configured for use in a Chevrolet SUBURBAN sport utility vehicle's rear seating area, air container 450 is between about 5 feet in length, about 2 feet in width (at the wider top portion), and about 2.5 total feet in height, with the wider top portion having a height of about 1.5 feet.

An air container according to various aspects of the invention is said to vacate a portion of a structure when it no longer substantially occupies the portion. An air container can vacate a portion of a structure by collapsing to a predetermined collapsed state, substantially deflating a flexible shell, or by simply leaving the portion in any state that permits it to pass through intervening windows, doorways, etc.

The isolation provided by an air container of the invention need not be complete or even nearly complete to qualify as substantial for a particular purpose. As may be better understood with reference to FIG. 2, exemplary air container 150 includes a semi-rigid shell 200 fabricated from material that is only partially air-impermeable. However, the material is impermeable enough to allow air container 150 to substantially prevent convection between adjacent air masses in thermal system 100. Even this partial prevention of convection between front and rear compartments 120 and 130 of vehicle 110 can significantly enhance driver comfort and energy efficiency, especially during the short trips drivers typically take with their vehicles.

Shell 200 of air container 150 comprises close-knit nylon fabric (e.g., of the type used in auto shade screens and nylon backpacks) that is supported by a frame. The fabric can be treated with a suitable sealant. Because even very close-knit nylon, unless treated with a sealant, is only partially air-impermeable, an envelope of such material would quickly deflate if untreated and supported only by internal air pressure.

A semi-rigid shell is not required to obtain various benefits of an air container according to various aspects of the invention, but it provides particular benefits of its own. Such a shell can be collapsible to a predetermined collapsed shape and expandable to a predetermined expanded shape. A predetermined collapsed shape is any shape of a shell that is fairly consistent when the shell is collapsed to substantially its minimum volume. By assuming a fairly consistent shape when collapsed, a shell can be more easily stored and transported. A predetermined expanded shape is any shape of a shell that is fairly consistent when the shell is expanded to substantially its maximum volume. By assuming a fairly consistent shape when expanded, the shell can be dimensioned and configured to fit within a particular portion of a particular structure.

As may be better understood with reference to FIG. 4, for example, air container 450 has a shell that, when in its predetermined expanded shape, fits in the rear seating portion 430 of a vehicle 410. The shell of air container 450 remains substantially below the level of the rear window 415 of vehicle 410. Advantageously, air container 450 does not obstruct the line of sight between rear window 415 and a driver seated in the front seating portion 420 of vehicle 410.

Figure 2:
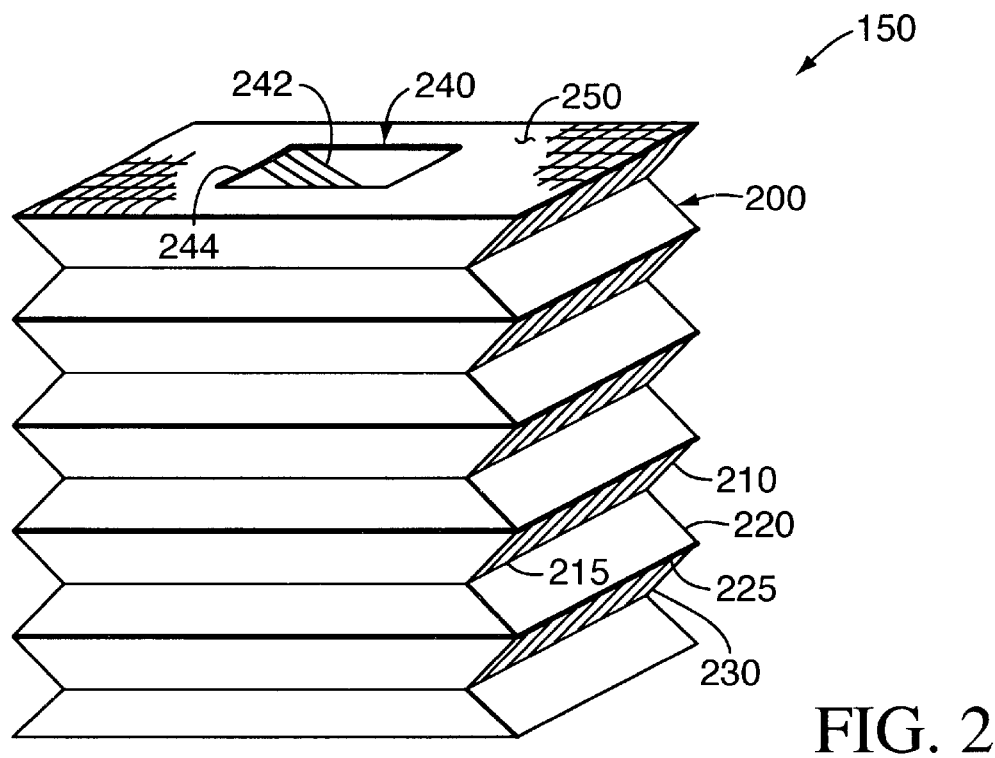
FIG. 2 is a perspective view of the air container of FIG. 1.

Semi-rigid shell 200 of exemplary air container 150 is structured like an accordion to make it collapsible to a predetermined collapsed shape and expandable to a predetermined expanded shape. (FIG. 2 depicts shell 200 approximately midway between the two predetermined shapes.) Shell 200 includes two rigid end walls (e.g., fabric stretched about a rigid tubular frame) and four semi-rigid side walls with several rigid panels flexibly connected to each other. Examples of these panels are panel 210 and adjacent panel 220, which are connected by a hinged portion 215 of the fabric of shell 200, which is common to both panels. Another hinged portion 225 connects panel 220 to another adjacent panel 230, which in turn connects to another adjacent panel, and so on. In variations, other suitable types of semi-rigid shells can be employed, such as wire mesh with embedded sealant and inherent stiffness, and a flexible envelope (e.g., of nylon supported by loops of stiff wire-like material (e.g., spring steel), similar to the arrangement in children's collapsible tunnel toys.

When shell 200 assumes the collapsed shape, air container 150 is substantially deflated and has a small volume, and the panels of the shell's side walls are folded up onto each other. When shell 200 assumes the expanded shape, air container 150 is substantially inflated and has considerable volume (much greater than its deflated volume). In the expanded shape, the side walls of shell 200 are stretched out such that the panels of each side wall are nearly parallel to each other, as depicted in FIG. 1 and FIG. 3.

An air container according to a various aspects of the invention can optionally include various additional features. For example, the end walls of an air container can include handles for a user to grasp when manually expanding or collapsing the container. Such handles can also be employed for tying the unit to a support point within the surrounding structure (e.g., headrests of a vehicle).

A particularly advantageous additional feature (also an option) is a selective air passage that permits air to enter the container's shell when it is expanded. Such an air passage can open to permit air to exit the shell when the shell is to be collapsed. As may be better understood with reference to FIG. 2, for example, air container 150 includes an air passage 240 in one of its end walls 250. Exemplary air passage 240 includes a reinforced border along an opening in wall 250 and a flap 242 hingedly attached to wall 250 along one edge 244. When closed, flap 242 covers the opening in wall 250, preferably with a substantially airtight seal. When open, flap 242 swings away from the opening to permit passage of air between the interior and exterior of shell 200.

Air passage 240 should be large enough to permit air to quickly enter shell 200 during expansion of shell 200, to the extent desired for a particular implementation. Although air passage 240 is depicted in FIGS. 1 and 2 as being considerably smaller than end wall 250 of shell 200, air passage 240 can be enlarged to occupy considerably more of an end wall's area if desired. To effectively double air intake efficiency, both end walls (wall 250 and an opposite wall not shown in FIG. 2) can have air passages. In variations, air passages can even be incorporated into the side wall of an air container's shell.

An air container according to various aspects of the invention can inflate and deflate through any suitable type of selective air passage, in addition to exemplary air passage 240. Suitable types of selective air passages include valves of the type used in inflatable vinyl "air mattresses" and manually actuated openings that an operator can open for inflation and deflation and leave closed otherwise.

Preferably, flap 242 is somewhat longer than the opening in wall 250 and has a releasable attachment structure at its end. Such structure (not shown) permits flap 242 to be releasably secured in a closed position. An example of suitable attachment structure is a pair of complementary VELCRO strips affixed to the inside of wall 250 and the end of flap 242.

Figure 5:
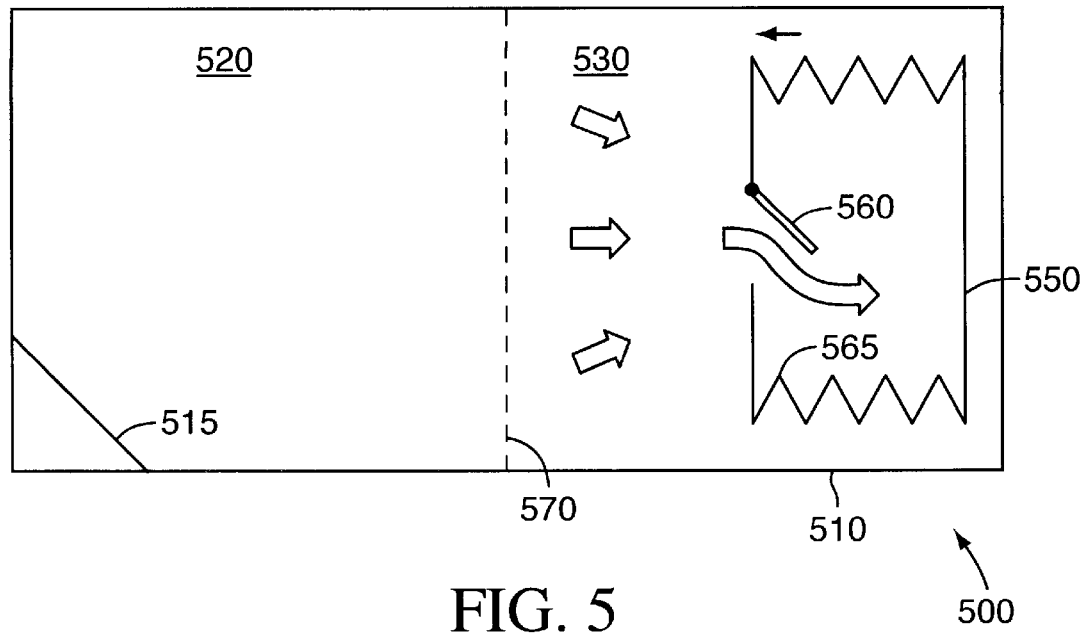
FIG. 5 is a schematic side view illustrating inflation of an air container in one portion of a structure according to various aspects of the invention.
Figure 6:
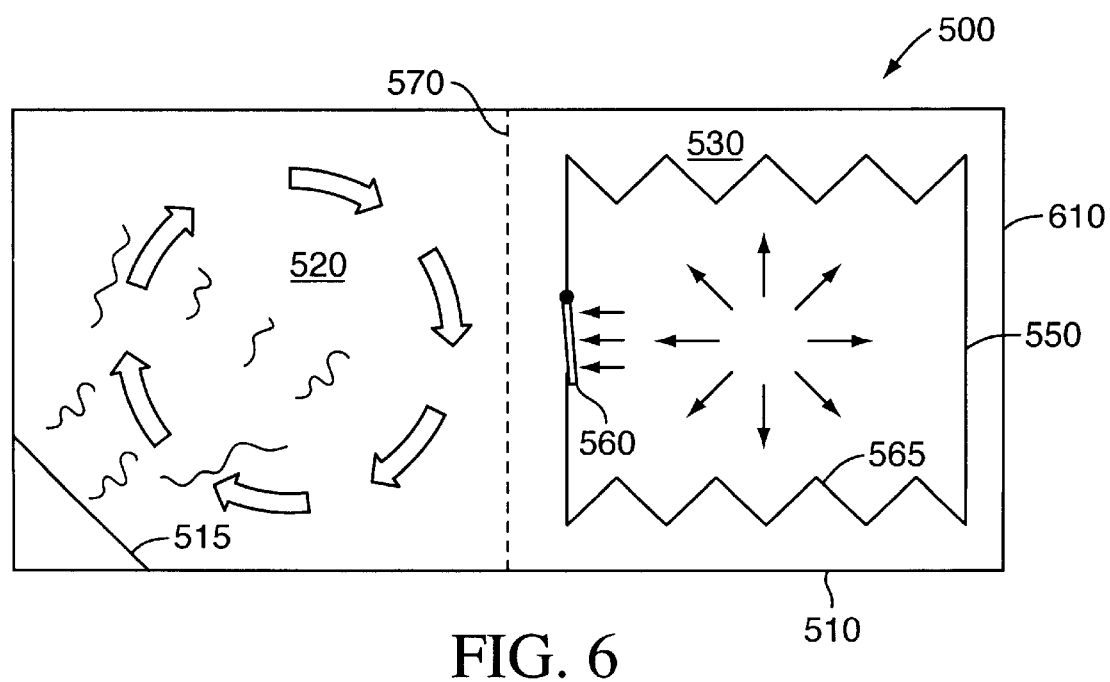
FIG. 6 is a schematic side view illustrating prevention of convection by the air container of FIG. 5.

An example of the operation of a system according to various aspects of the invention may be better understood with reference to simplified thermal system 500 of FIGS. 5 and 6. (This operational example does not limit the scope of the invention in any way; that is a function reserved exclusively for the issued claims.) System 500 includes: a structure 510 having two portions 520 and 530; an air container 550 having a semi-rigid shell 565 and a selective air passage 560; and a heat source 515. Portions 520 and 530 of structure 510 have adjacent air masses; the border between the air masses is depicted by a vertical dashed line 570. (In most systems other than simplified system 500, one air mass will surround the adjacent one to at least some extent.)

FIG. 5 depicts inflation of air container 550 in portion 530 of structure 510. Air within structure 510, depicted by unlabeled arrows in FIGS. 5 and 6, enters shell 565 of container 550 through air passage 560. Like passage 240 of FIGS. 1 and 2, air passage 560 includes a swinging flap, which air entering the shell of the air container can push open.

In FIG. 6, air container 550 is depicted as being fully inflated to a predetermined expanded shape, substantially occupying portion 530. Air passage 560 is closed due to closure of its flap, which a somewhat higher air pressure within shell 565 (depicted by outward-facing arrows) can help reinforce. In this closed position, air passage 560 prevents air from exiting shell 565.

Heat source 515 is active and air within portion 520 circulates as a result. Air container 550 substantially prevents convection between portions 520 and 530, enhancing efficiency and speed of heating within portion 520.

An air container according to various aspects of the invention is particularly advantageous in providing short-term isolation between portions of a structure. Short-term isolation is all that is necessary to enhance operator comfort and heating or cooling efficiency in many situations, such as the short trips drivers typically take in their vehicles.

In many implementations, the air container can also enhance steady-state heating and cooling efficiency. The air container can provide such enhancement by insulating an interior portion of a structure from an unused portion that is adjacent one or more of the structure's exterior walls. Structure 510 of system 500 can be viewed as part of such a structure that contains interior and unused portions. With this viewpoint, portions 520 and 530 are the interior and unused portions, respectively, of the structure, and wall 610 (FIG. 6) of structure 510 is an exterior wall.

As discussed above, air container 550 substantially prevents convection between portions 520 and 530. Thus, air container 550 thermally isolates the air mass within portion 520 from exterior wall 610 in the same way that a conventional dual-pane window isolates the interior of a house from its exterior. Heat flow between the air mass in portion 520 and the outside of exterior wall 610 is largely restricted to conduction through the walls of air container 550.

In a variation, an air container's shell can be fabricated from material that has insulating properties. Examples of materials that can help prevent conductive heat transfer include double-wall cardboard and various types of polymers. Foil backing of shell material can inhibit radiated heat transfer.

An air container according to various aspects of the invention can include structure for inflating itself. As one example, such an air container can include an Iinternal air pump that draws air into the air container's shell under battery power or an external power source. As another example, the air container can employ self-inflation structure and techniques disclosed in U.S. Pat. No. 5,033,133 to Nissen. The disclosure of this aforementioned patent is incorporated herein by reference, as are any patents, patent applications, or printed publications incorporated by reference therein.

In a variation, the air container can be incorporated into surrounding structure. For example, an air container can be integral to a vehicle that it occupies and vacates, as desired. Structure in the vehicle can inflate and deflate the air container, and can cause the air container to vacate the vehicle by drawing it (in its collapsed form) into a compartment of the vehicle.

Public Notice Regarding the Scope of the Invention and Claims

The inventor considers various elements of the aspects and methods recited in the claims filed with the application as advantageous, perhaps even critical to certain implementations of his invention. However, the inventor regards no particular element as being "essential," except as set forth expressly in any particular claim.

A general method contemplated by the inventor for selectably isolating an air mass within a first portion of a structure from an adjacent air mass within a second portion of the structure, which omits numerous advantageous but non-essential elements, includes just the following acts: (1) when isolation is desired, substantially occupying the first portion with an air container that substantially prevents convection between the air masses within the first and second portions; and (2) when isolation is not desired, substantially vacating the air container from the first portion.

A general air container contemplated by the inventor for isolating an air mass within an unused portion of a standard width road vehicle, which also omits advantageous but non-essential elements, includes only: (1) a semi-rigid, substantially air-impermeable shell that is collapsible to a predetermined collapsed shape and expandable to a predetermined expanded shape; and (2) a selective air passage that permits air to enter the shell during expansion thereof; and that can be selectably opened to permit air to exit the shell when the shell is to be collapsed. In this air container, at the expanded shape the shell is dimensioned such that the length of the shell occupies substantially all of the interior width of the vehicle.

While the invention has been described in terms of preferred embodiments and generally associated methods, the inventor contemplates that alterations and permutations of the preferred embodiments and methods will become apparent to those skilled in the art upon a reading of the specification and a study of the drawings.

In one variation, for example, a number of air containers having rigid shells stack on top of each other to isolate the air mass within a single large portion of a structure. In another variation, the air container can include a manual or automatic pump or fan to inflate and deflate its shell. In yet another variation, the "air" within the shell can comprise a single gas (e.g., carbon dioxide from a pressurized inflation cartridge) or a mixture of gases different than that found in the ambient air.

Accordingly, neither the above description of preferred exemplary embodiments nor the abstract defines or constrains the invention. Rather, the issued claims variously define the invention. Each variation of the invention is limited only by the recited limitations of its respective claim, and equivalents thereof, without limitation by other terms not present in the claim. For example, method claims that do not recite acts regarding vehicles read on methods that include, and exclude, installation of an air container within a portion of a vehicle. As another example, claims not reciting limitations regarding a particularly advantageous selective air passage of the invention read on devices and methods that include, and exclude, the use of such an air passage.

In addition, aspects of the invention are particularly pointed out in the claims using terminology that the inventor regards as having its broadest reasonable interpretation; the more specific interpretations of 35 U.S.C. §112(6) are only intended in those instances where the terms "means" or "steps" are actually recited. The words "comprising," "including," and "having" are intended as open-ended terminology, with the same meaning as if the phrase "at least" were appended after each instance thereof.

What is claimed is:

1. A method for heating or cooling a structure, the method comprising:
    (a) when isolation is desired, substantially occupying a first portion of a structure with an air container that substantially prevents convection between an air mass within the first portion and an air mass within an adjacent, second portion of the structure;
    (b) when isolation is not desired, substantially vacating the air container from the first portion; and
    (c) changing the temperature of the air mass within the second portion of the structure;
    whereby the temperature change of the air mass within the second portion is significantly more rapid than the temperature change of the air mass within the first portion when the air container substantially occupies the first portion.

2. The method of claim 1 wherein substantially occupying the first portion includes inflating the air container within the first portion.

3. The method of claim 1 wherein substantially vacating the first portion includes deflating the air container within the first portion.

4. The method of claim 1 wherein substantially occupying the first portion is carried out with an air container including a semi-rigid, substantially air-impermeable shell that is collapsible to a predetermined collapsed shape and expandable to a predetermined expanded shape.

5. The method of claim 4 wherein substantially occupying the first portion is carried out with an air container including a selective air passage that (1) permits air to enter the shell during expansion thereof, and (2) can be selectably opened to permit air to exit the shell when the shell is to be collapsed.

6. The method of claim 5 wherein substantially occupying the first portion includes inflating the air container within the first portion by transitioning the shell at least substantially from the collapsed shape to the expanded shape.

7. The method of claim 5 wherein substantially vacating the first portion includes deflating the air container within the first portion by transitioning the shell at least substantially from the expanded shape to the collapsed shape.

8. The method of claim 1 further comprising performing the method within a structure that is a vehicle.

9. The method of claim 8 further comprising cooling the air masses within the vehicle, whereby the air mass within the second portion is cooled significantly faster than the air mass within the first portion.

10. The method of claim 8 wherein performing the method occurs within a structure that is a sport utility vehicle having a first portion that is a cargo compartment of the vehicle.

11. The method of claim 10 wherein substantially occupying the first portion comprises inflating an air container dimensioned to fit, when fully inflated, in the cargo compartment with substantially all of its enclosed volume below the level of a rear window of the vehicle.

12. The method of claim 8 wherein performing the method occurs within a structure that is a sport utility vehicle having a first portion that is a rear seating area of the vehicle.

13. The method of claim 12 wherein substantially occupying the first portion comprises inflating an air container dimensioned to fit, when fully inflated, in the rear seating area with substantially all of its enclosed volume below the level of a rear window of the vehicle.

14. An air container for isolating an air mass within an unused portion of a standard width road vehicle, the air container comprising:
   (a) a semi-rigid, substantially air-impermeable enclosed shell that is collapsible to a predetermined collapsed shape and expandable to a predetermined expanded shape; and
   (b) an air passage between the inside and the outside of the shell;
   (c) wherein at the expanded shape the shell is dimensioned such that the length of the shell occupies substantially all of the interior width of the vehicle, and the height of the shell remains substantially below the level of a rear window of the vehicle when the shell assumes the expanded shape at its intended location within the vehicle.

15. An energy efficient structure comprising:
   (a) a first portion containing a first air mass;
   (b) a second portion containing a second air mass adjacent the first air mass;
   (c) a semi-rigid, substantially air-impermeable shell that is collapsible and expandable; and
   (d) means for permitting air to enter the shell during expansion thereof, and to exit the shell when the shell is to be collapsed.

* * * * *